(12) United States Patent
Mwafy et al.

(10) Patent No.: US 10,974,287 B2
(45) Date of Patent: Apr. 13, 2021

(54) CABLE CLEANING AND ROLLING SYSTEM

(71) Applicant: UNITED ARAB EMIRATES UNIVERSITY, Al-Ain (AE)

(72) Inventors: Asel Mohamed Mwafy, Al Ain (AE); Abdel-Hamid Ismail Mourad, Al Ain (AE); Mouza Saeed Al Mansoori, Al Ain (AE); Farah Ashraf Genena, Al Ain (AE); Shahd Aahed Anshasy, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 9 days.

(21) Appl. No.: 16/274,530

(22) Filed: Feb. 13, 2019

(65) Prior Publication Data

US 2020/0254492 A1    Aug. 13, 2020

(51) Int. Cl.
*B08B 3/02* (2006.01)
*B08B 1/00* (2006.01)
(Continued)

(52) U.S. Cl.
CPC .............. *B08B 3/022* (2013.01); *B08B 1/002* (2013.01); *B08B 1/008* (2013.01); *B08B 1/02* (2013.01); *B08B 3/041* (2013.01); *B08B 3/14* (2013.01); *B08B 13/00* (2013.01); *B65H 75/38* (2013.01); *H02G 11/02* (2013.01); *B08B 2240/02* (2013.01); *B65H 2701/32* (2013.01); *B65H 2701/34* (2013.01)

(58) Field of Classification Search
CPC .. B08B 1/008; B08B 1/04; B08B 1/02; B08B 3/022; B08B 9/0436; B08B 9/023; B08B 9/00; B08B 3/041; B08B 3/042
See application file for complete search history.

(56) References Cited

U.S. PATENT DOCUMENTS

| 3,999,240 A | 12/1976 | Uchida |
| 4,502,175 A | 3/1985 | Hillis |

(Continued)

FOREIGN PATENT DOCUMENTS

| CN | 106269666 A | * | 1/2017 |
| CN | 107185917 A | * | 9/2017 |

(Continued)

*Primary Examiner* — Michael E Barr
*Assistant Examiner* — Omair Chaudhri
(74) *Attorney, Agent, or Firm* — Nath, Goldberg & Meyer; Richard C. Litman

(57) ABSTRACT

The cable cleaning and rolling system combines an automated cleaning and winding system for industrial cables and the like with a water filtration system for recycling the water used to clean the cable. The cable cleaning and rolling system includes a hollow base, a feed drum and a receiving drum. The feed drum is adapted for releasably retaining and feeding the cable to be cleaned, and the receiving drum is adapted for receiving and rolling the cable after it has been cleaned and dried. At least one nozzle, for spraying cleaning water on the cable, at least one brush, for scrubbing the cable, and a blower, for drying the cable, are positioned between the feed drum and the receiving drum. Waste water from the cleaning is received within the hollow base, extracted therefrom, and delivered to a water filtration unit for recycling.

12 Claims, 3 Drawing Sheets

(51) Int. Cl.
*B08B 11/02* (2006.01)
*B08B 13/00* (2006.01)
*B08B 3/14* (2006.01)
*B65H 75/38* (2006.01)
*H02G 11/02* (2006.01)
*B08B 3/04* (2006.01)
*B08B 1/02* (2006.01)

(56) References Cited

U.S. PATENT DOCUMENTS

| | | | |
|---|---|---|---|
| 4,591,390 A | 5/1986 | Scott et al. | |
| 5,056,185 A | 10/1991 | Schotter | |
| 5,356,480 A * | 10/1994 | Melgeorge | A62C 33/02 134/122 P |
| 8,250,697 B2 | 8/2012 | Lee et al. | |
| 2007/0017862 A1* | 1/2007 | Shaver | C02F 9/00 210/513 |
| 2014/0090666 A1* | 4/2014 | Thomas | B24B 27/033 134/8 |
| 2015/0014450 A1* | 1/2015 | Suden | B05B 9/007 239/722 |
| 2018/0229278 A1* | 8/2018 | Myslenski | B08B 9/023 |

FOREIGN PATENT DOCUMENTS

| | | | |
|---|---|---|---|
| CN | 107601153 A | 1/2018 | |
| CN | 207154269 U | 3/2018 | |
| CN | 207325425 U | 5/2018 | |
| FR | 2596295 A1 * | 10/1987 | C23G 5/00 |
| KR | 20060012525 A * | 2/2006 | |

\* cited by examiner

CABLE CLEANING AND ROLLING SYSTEM

BACKGROUND

1. Field

The disclosure of the present patent application relates to the cleaning and bundling of industrial cables, and particularly to a portable system. for cleaning and rolling industrial cables which purifies and recycles the cleaning water.

2. Description of the Related Art

Industrial cables are typically prepared by first using a conventional cleaning system, followed by manual rolling of the cleaned cables onto a spool. A wide variety of cleaning systems are known, typically including a nozzle or spout for spraying a cleaning fluid, along with a brush or sponge for removing contaminants, particulate matter and the like from the cable. The cleaning process typically results in large volumes of waste water, which must be siphoned off and disposed of preferably in an environmentally safe manner. It would obviously be desirable to be able to recycle this waste water in order to save energy and costs, as well as minimizing the environmental impact of the cleaning process. It would also be desirable to be able to combine such an environmentally friendly cleaning process with an automated rolling system, allowing for an overall reduction in labor time and costs. Thus, a cable cleaning and rolling system solving the aforementioned problems is desired,

SUMMARY

The cable cleaning and roiling system combines an automated cleaning and winding system for industrial cables and the like with a water filtration system for recycling the water used to clean the cable. The cable cleaning and rolling system includes a hollow base, having opposed upper and lower surfaces, with the upper surface having a plurality of openings formed there through. The plurality of openings are in open communication with an interior of the hollow base. A feed drum and a receiving drum are each mounted on the upper surface of the hollow base. The feed drum is adapted for releasably retaining and feeding the cable to be cleaned, and the receiving drum is adapted for receiving and rolling the cable after it has been cleaned and dried, Rotation of the receiving drum drives feeding rotation of the feed drum, with the torque being transferred to the feed drum by the driven translation of the cable (i.e., the receiving drum is driven to rotate, winding the cable around it, thus pulling the cable from the feed drum to the receiving drum, with the cable being unwound from around the feed drum).

At least one nozzle is mounted on the upper surface of the hollow base. The at least one nozzle is positioned between the feed drum and the receiving drum, adjacent the feed drum. The at least one nozzle is adapted for selectively spraying clean water on a portion of the cable passing through the system. with the waste water created by the cleaning of the cable, and dripping from the cable, to be received within the interior of the hollow base through the plurality of openings.

A blower is mounted on the upper surface of the hollow base, with the blower being positioned between the feed drum and the receiving drum, adjacent the receiving drum. The blower is adapted for selectively blowing air on the cleaned portion of the cable to dry the cable before winding around the receiving drum. At least one brush is also mounted on the upper surface of the hollow base, between the at least one nozzle and the blower, for scrubbing the cable after the clean water has been sprayed on it and prior to drying by the blower.

A water filtration unit is in fluid communication with the interior of the hollow base and the at least one nozzle. Waste water received within the interior of the hollow base is extracted for filtering by the water filtration unit. The water filtration unit produces the clean water which is fed back to the at least one nozzle.

These and other features of the present disclosure will become readily apparent upon further review of the following specification and drawings.

DETAILED DESCRIPTION OF THE PREFERRED EMBODIMENTS

Figure 1:
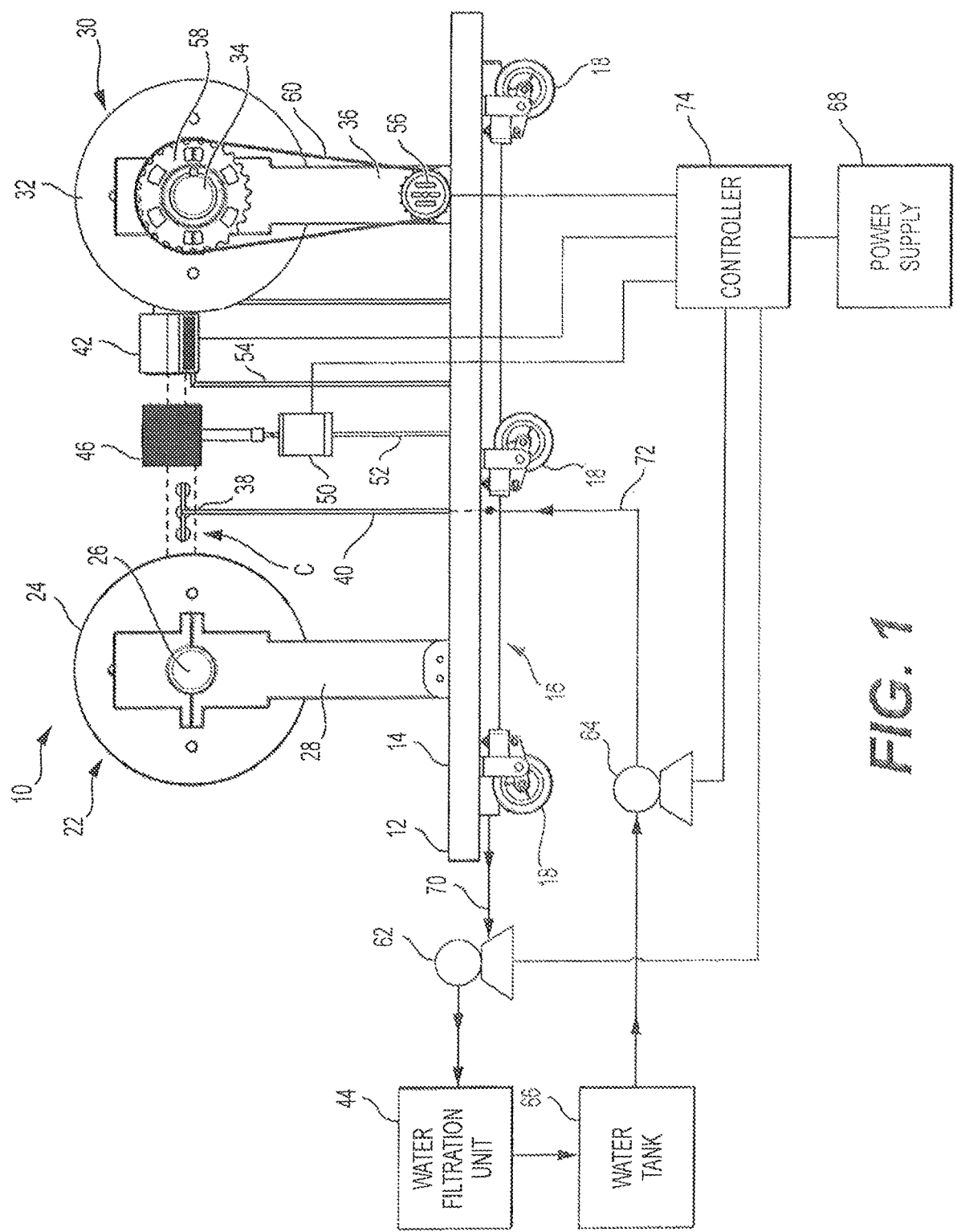
FIG. 1 diagrammatically illustrates a cable cleaning and robing system.
Figure 2:
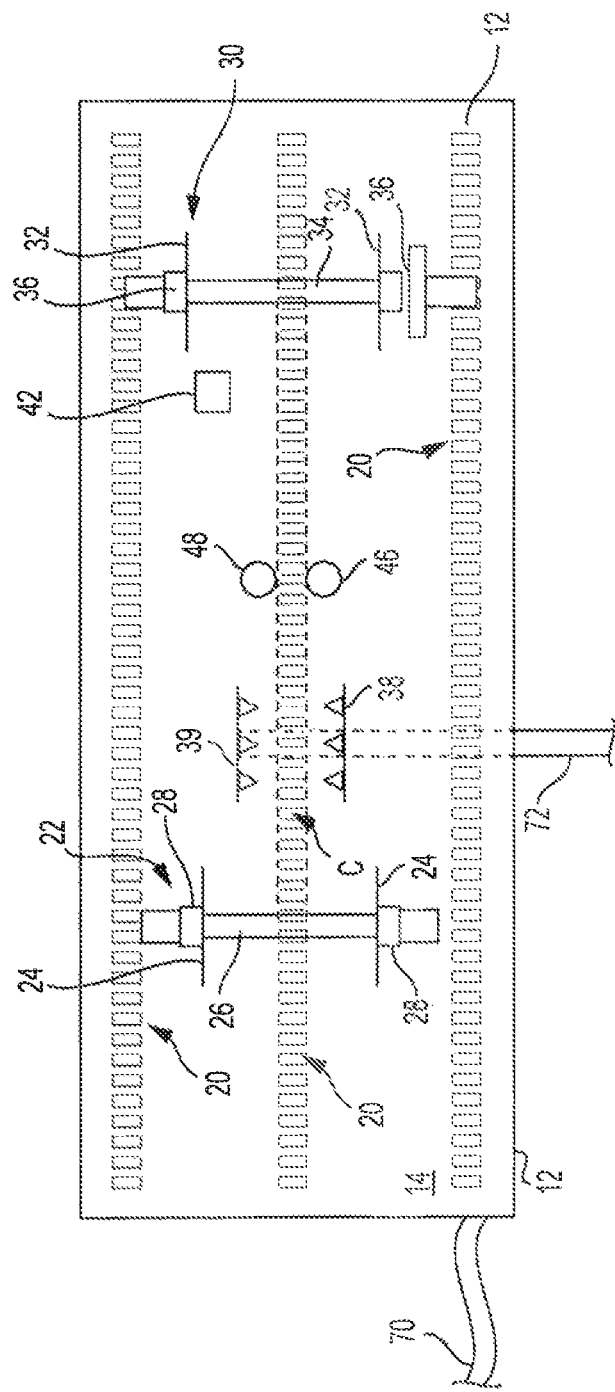
FIG. 2 is a partial top view of the cable cleaning and rolling system.
Figure 3:
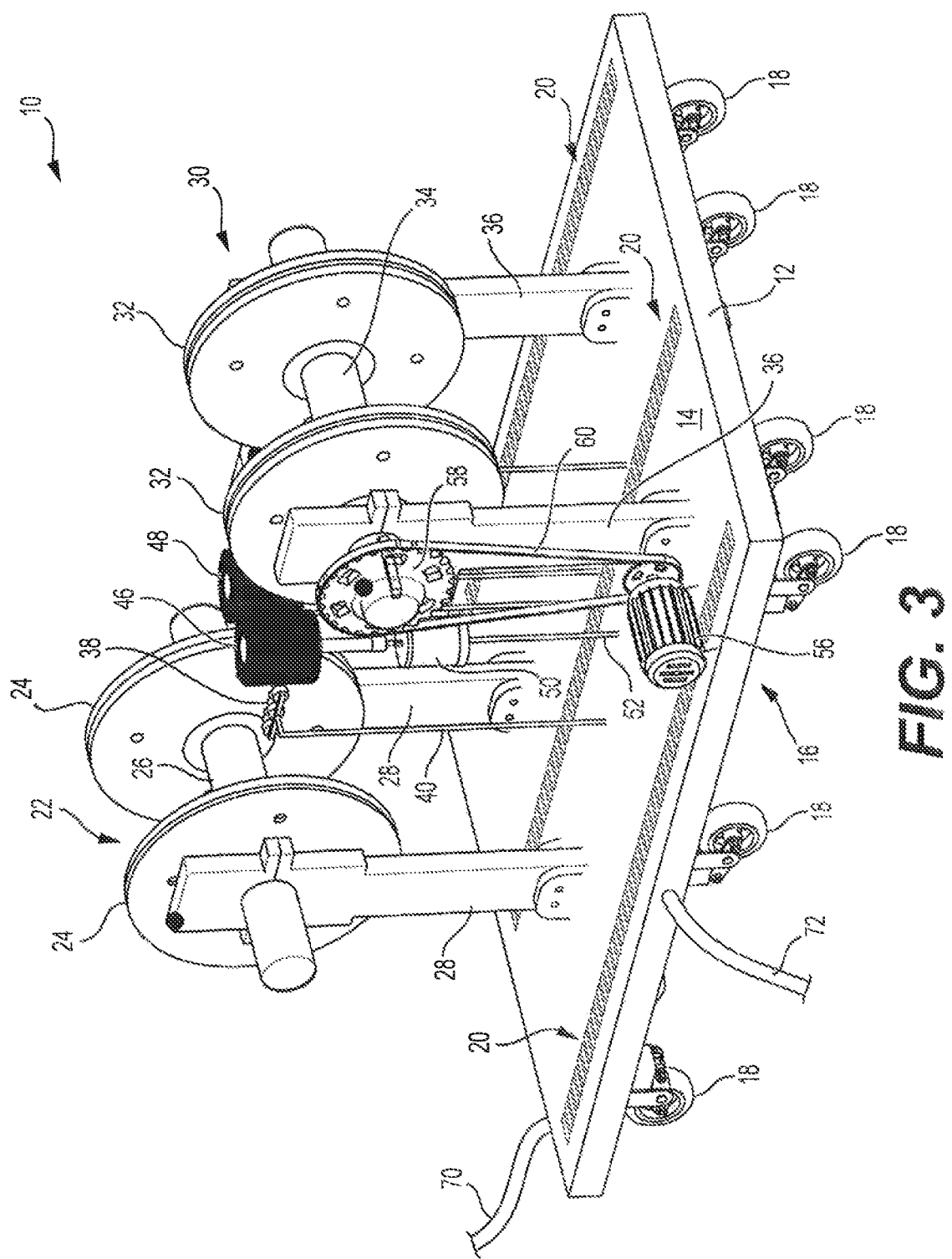
FIG. 3 is a partial perspective view of the cable cleaning and rolling system Similar reference characters denote corresponding features consistently throughout the attached drawings.

As shown in FIGS. 1-3, the cable cleaning and roiling system 10 combines an automated cleaning and winding system for industrial cables and the like with a water filtration system for recycling the water used to clean the cable. The cable cleaning and rolling system 10 includes a hollow base 12, having opposed upper and lower surfaces 14, 16, respectively, with the upper surface 14 having a plurality of openings 20 formed there through. It should be understood that the overall contouring and relative dimensions of the hollow base 12 are shown for exemplary purposes only. Further, it should be understood that the three linear arrays of openings 20 are also shown for exemplary purposes only. The plurality of openings 20 are in open communication with an interior of the hollow base 12. As shown in FIGS. 1 and 3, a plurality of wheels 18 may be mounted on the lower surface 16 of the hollow base 12. Although shown as conventional casters, it should be understood that any suitable type, or number, of wheels 18 may be mounted on the hollow base 12 to provide portability for the hollow base 12.

A feed drum 22 and a receiving drum 30 are each mounted on the upper surface 14 of the hollow base 12, The feed drum 22 is adapted for releasably retaining and feeding the cable to be cleaned (shown as exemplary cable C in FIGS. 1 and 2), and the receiving drum 30 is adapted for receiving and rolling the cable C after it has been cleaned and dried. Rotation of the receiving drum 30 drives feeding rotation of the feed drum 22, with the torque being transferred to the feed drum 22 by the driven translation of the cable C (i.e., the receiving drum 30 is driven to rotate, winding the cable C around it, thus pulling the cable C from the feed drum 22 to the receiving drum 30, with the cable C being unwound from around the feed drum 22).

In FIGS. 1-3, the feed drum 22 is shown as a conventional spool, including a first pair of end plates 24 mounted adjacent to opposed ends of a feed axle 26. Similarly, the receiving drum 30 is shown identically, including a second pair of end plates 32 mounted adjacent to opposed ends of a receiving axle 34. It should, however, be understood that feed drum 22 and receiving drum 30 may be any suitable type of drum, spool or the like. As shown, a first pair of vertical supports 28 is provided for supporting the feed drum 22. The opposed ends of the feed axle 26 are respectively rotatably mounted on the first pair of vertical supports 28, suspending the feed drum 22 above the upper surface 14 of the hollow base 12. Similarly, a second pair of vertical supports 36 is provided for supporting the receiving drum 30. The opposed ends of the receiving axle 34 are respectively rotatably mounted on the second pair of vertical supports 36, suspending the receiving drum 30 above the upper surface 14 of the hollow base 12 at the same height as feed drum 22. It should be understood that the overall contouring and relative dimensions of the first pair of vertical supports 28 and the second pair of vertical supports 36 are shown for exemplary purposes only.

At least one nozzle 38 is mounted on the upper surface 14 of the hollow base 12. As shown in FIGS. 1 and 3, the at least one nozzle 38 may be suspended above the upper surface 14 of the hollow base 12 by a feed pipe or conduit 40, which also serves to transfer clean water thereto. As shown, the at least one nozzle 38 is positioned between the feed drum 22 and the receiving drum 30, adjacent to the feed drum 22. The at least one nozzle 38 is adapted for selectively spraying clean water on a portion of the passing cable C, with the waste water created by the cleaning of the cable C dripping from the cable C and being received within the interior of the hollow base 12 through the plurality of openings 20, in FIGS. 2 and 3, two sets of nozzles 38 and 39 are shown, with each set including three individual nozzles. It should be understood that the number, type and overall configuration of nozzles are shown for exemplary purposes only. As shown in FIG. 2, when two sets of nozzles 38, 39 are provided, the sets of nozzles 38 and 39 may be spaced apart from one another such that the portion of the cable. C passes therebetween, allowing the clean water to be sprayed on either side of cable C, simultaneously.

A blower 42. is mounted on the upper surface 14 of the hollow base 12, with the blower 42 being positioned between the feed drum 22 and the receiving drum 30, adjacent the receiving drum 30. The blower 42 is adapted for selectively blowing drying air on the cleaned portion of the cable C to dry cable C before winding around the receiving drum 30. As shown, blower 42 may be supported by a vertical mount 54, positioning blower 42 at the same height as at least one nozzle 38 (and at the same height as the linear path of cable C). It should be understood that blower 42 may be any suitable type of blower, dryer, fan or the like.

Further, at least one brush 46 is also mounted on the upper surface 14 of the hollow base 12, between the at least one nozzle 38 and the blower 42, for scrubbing the cable C after the clean water has been sprayed thereon and prior to drying by blower 42. As shown in FIGS. 2 and 3, a second brush 48 may be provided, such that the first and second brushes 46 and 48 are spaced apart from one another, so the sprayed portion of the cable C passes therebetween, The at least one brush 46 may be supported by a vertical support 52, positioning at least one brush 46 at the same height as at least one nozzle 38 and blower 42 (and at the same height as the linear path of cable C). A brush motor 50 may be provided for selectively driving rotation of the at least one brush 46.

In addition to the driven rotation of the at least one brush 46, a receiving motor 56 may be provided for selectively driving rotation of the receiving drum 30 for drawing and winding of the cable C. In FIGS. 1 and 3, a gear 58 is shown mounted on one end of receiving axle 34 of the receiving drum 30, with the receiving motor 56 being coupled thereto by a chain 60. However, it should be understood that any suitable type of coupling between receiving drum 30 and receiving motor 56 may be utilized. Additionally, it should he understood that the brush motor 50 and receiving motor 56 may be any suitable type of motors, or may be replaced by any suitable type of rotational drive systems.

A water filtration unit 44 is in fluid communication with the interior of the hollow base 12 for receiving and filtering the waste water. As shown in FIG. 1, a first pump 62 may be used to extract the waste water from within the interior of the hollow base 12 (via line 70) and deliver the waste water to water filtration unit 44 for filtering. The water filtration unit 44 produces the clean water which is stored in water tank 66 and fed back to the at least one nozzle 38. it should be understood that any suitable type of water filtration or purification system may be utilized to produce the clean water from the waste water.

Following filtration by the water filtration unit 44, the clean water may be temporarily stored in the water tank 66, prior to selective transfer thereof to the at least one nozzle 38. As shown in FIG. 2, a second pump 64 may be used to selectively draw the clean water from the water tank 66 for delivery to at least one nozzle 38 (via line 72). The brush motor 50, the receiving motor 56, first pump 62 and second pump 64 may be provided with power by power supply 68, which may be any conventional source of power, and may be controlled by controller 74, which may be any suitable type of controller, processor, programmable logic controller, personal computer or the like.

It is to be understood that the cable cleaning and rolling system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A cable cleaning and rolling system, comprising:
   a hollow base having a pair of side surfaces, a pair of opposed edges, and opposed upper and lower surfaces, the upper surface having a plurality of openings formed therethrough, wherein the plurality of openings are configured in three linear arrays traversing the upper surface from one edge of the pair of opposed edges to the other edge of the pair of opposed edges, the entirety of the array being in open communication with an interior of said hollow base;
   a feed drum mounted on the upper surface of the hollow base, whereby the feed drum is adapted for releasably retaining and feeding a cable;
   a receiving drum mounted on the upper surface of the hollow base, whereby the receiving drum is adapted for receiving and rolling the cable, rotation of the receiving drum driving feeding rotation of the feed drum;
   at least one nozzle mounted on the upper surface of the hollow base, the at least one nozzle being positioned between the feed drum and the receiving drum, adjacent to the feed drum, whereby the at least one nozzle is adapted for selectively spraying clean water on a portion of the cable, waste water being received within the interior of the hollow base through the plurality of openings;
   a blower mounted on the upper surface of the hollow base, the blower being positioned between the feed drum and the receiving drum, adjacent the receiving drum, whereby the blower is adapted for selectively blowing drying air on the portion of the cable; and a water filtration unit in fluid communication with the interior of the hollow base and the at least one nozzle, wherein the waste water received within the interior of the hollow base is extracted therefrom for filtering by the water filtration unit, the water filtration unit producing the clean water which is fed to the at least one nozzle, wherein the water filtration unit includes:
   at least one pump for driving the waste water from the interior of the hollow base through the water filtration unit; and
   a water tank in fluid communication with the water filtration unit and the at least one nozzle, the water tank selectively storing the clean water to be transferred to the at least one nozzle.

2. The cable cleaning and rolling system as recited in claim 1, further comprising a plurality of wheels mounted on the lower surface of the hollow base.

3. The cable cleaning and rolling system as recited in claim 1, wherein the feed drum comprises a first pair of end plates mounted adjacent to opposed ends of a feed axle.

4. The cable cleaning and rolling system as recited in claim 3, further comprising a first pair of vertical supports, the opposed ends of the feed axle being respectively rotatably mounted on the first pair of vertical supports.

5. The cable cleaning and rolling system as recited in claim 4, wherein the receiving drum comprises a second pair of end plates mounted adjacent to opposed ends of a receiving axle.

6. The cable cleaning and rolling system as recited in claim 5, further comprising a second pair of vertical supports, the opposed ends of the receiving axle being respectively rotatably mounted on the second pair of vertical supports.

7. The cable cleaning and rolling system as recited in claim 1, wherein the at least one nozzle comprises first and second sets of nozzles spaced apart from one another such that the portion of the cable passes therebetween.

8. The cable cleaning and rolling system as recited in claim 1, further comprising at least one brush mounted on the upper surface of the hollow base, the at least one brush being positioned between the at least one nozzle and the blower.

9. The cable cleaning and rolling system as recited in claim 8, wherein the at least one brush comprises first and second brushes spaced apart from one another such that the portion of the cable passes therebetween.

10. The cable cleaning and rolling system as recited in claim 8, further comprising a brush motor for selectively driving rotation of the at least one brush.

11. The cable cleaning and rolling system as recited in claim 1, further comprising a receiving motor for selectively driving rotation of the receiving drum.

12. The cable cleaning and rolling system as recited in claim 11, further comprising:
   a gear mounted on the receiving drum; and
   a chain coupling the gear and the receiving motor.

* * * * *